April 29, 1958      C. E. ARNOLD ET AL      2,832,928
VOLTAGE REGULATOR FOR PULSE FORMING NETWORK
Filed July 17, 1953

INVENTORS
CHARLES E. ARNOLD
FRANCIS H. STITES
BY Michael Hertz
ATTORNEY

United States Patent Office 2,832,928
Patented Apr. 29, 1958

2,832,928

VOLTAGE REGULATOR FOR PULSE FORMING NETWORK

Charles E. Arnold, Norfolk, and Francis H. Stites, Wayland, Mass., assignors to Sylvania Electric Products Inc., a corporation of Massachusetts Application July 17, 1953, Serial No. 368,595

7 Claims. (Cl. 323—38)

The invention relates to charging circuits for pulse forming artificial transmission lines.

It relates in particular to an amplitude regulator for a charging circuit designed to pulse feed a magnetron or the like.

In such charging circuits there is often employed an artificial transmission line or Guillemin line, predominantly capacitative, feeding into an output circuit having a characteristic impedance equal to that of the line, the line being fed from a D. C. source such as an electronic D. C. power supply through an inductance and diode, the inductance and line and their resistances being of such magnitudes as to enable a surge of voltage applied to the inductance, diode and line to leave the line charged with a voltage equal to substantially twice the voltage applied to the combination, the inductance serving as a resonant choke, as explained in the patent to Sager 2,532,285. Such an arrangement throws a severe burden on the power supply to maintain a constant output voltage from the pulse forming network particularly when the duty cycle varies.

It is an object of the invention to provide constant amplitude of the voltage fed to a pulse forming network notwithstanding the burden on the power supply and furthermore notwithstanding supply line voltage changes or electronic power supply variations or other ambient conditions tending to change the voltage magnitude of the current fed to the network.

Figure 1:
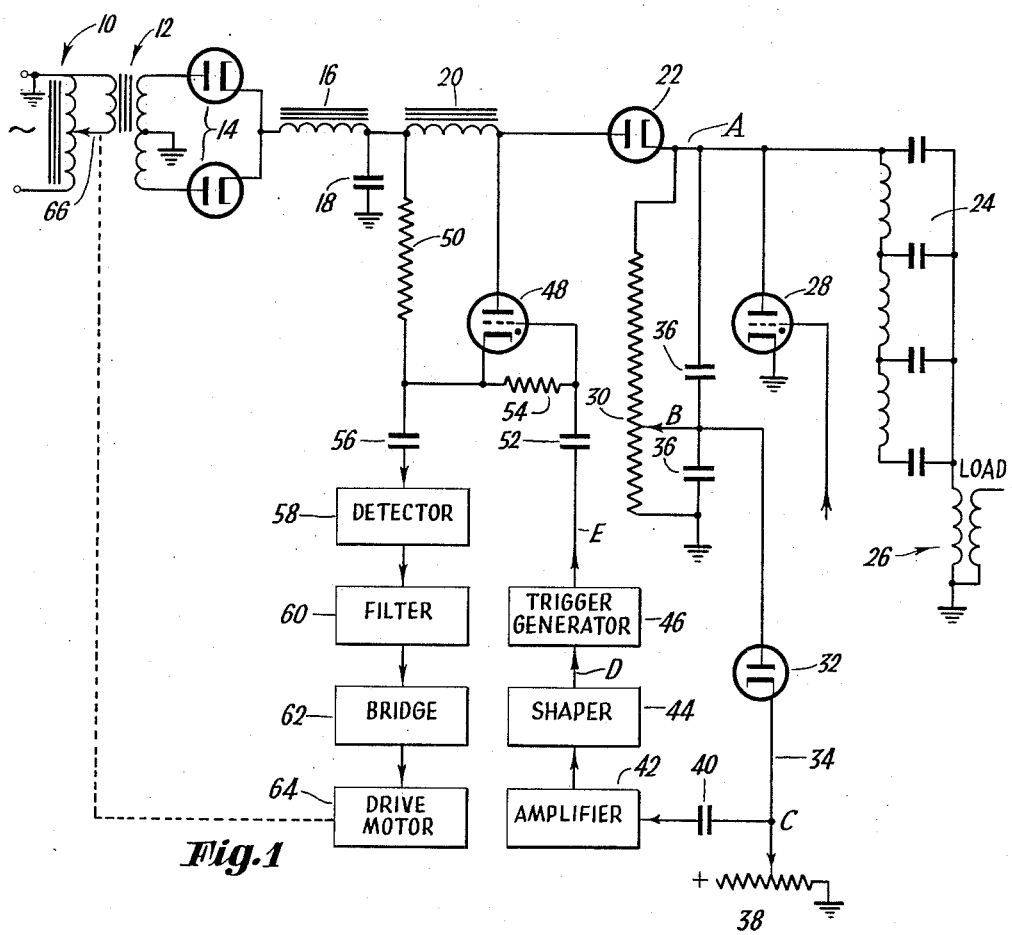

A better understanding of my invention as well as other and further objects thereof may be appreciated from the following description when considered in conjunction with the accompanying drawing in which Fig. 1 is a schematic diagram of the circuit embodying my invention.

Figure 2:
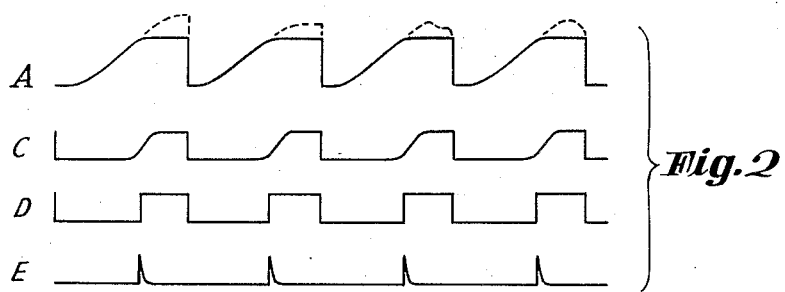

Fig. 2 represents the wave forms existing at designated points in the system.

Referring to the drawings more in detail, at 10 there is shown a variable autotransformer feeding into the low voltage primary of a transformer 12, the high voltage secondary of which is in a conventional full wave rectifier circuit involving a pair of diodes 14, the output from which diodes is filtered, as is conventional, by means of inductance 16 and capacitor 18. The filtered current is then fed into the pulse forming network including the inductor 20, the diode 22 and line 24. The line 24 has inductance and capacitance with an overall capacitative aspect and it may be either the simulated line shown or in the form of a potted Guillemin line. The line feeds into a load 26 including a magnetron, the load having the impedance of the line to avoid reflection and to secure best transfer of energy. To modulate the load there is provided the gas filled trigger tube 28 which when fired shorts the line through the tube and primary of the load transformer. At the very instant of shorting, the lag imposed by the inductance 20 prevents flow of current from the electronic amplifier into the pulse forming network and therefore a sharp pulse from the network itself is transmitted to the load.

In order to maintain the voltage on the pulse forming network 24 constant the following instrumentalities are employed: In parallel with the network 24 and trigger modulator tube 28 is a potentiometer 30 the tap of which leads to a pickoff diode 32 whose cathode 34 is subjected to a desired bias for a reason which will be explained immediately. The legs of the potentiometer are bypassed by suitable condensers 36 to steady the current flow through the potentiometer 30. The potentiometer serves to bypass a portion of the current flowing to the network to a voltage regulating control, the control functioning in accordance with whether the voltage applied to the anode of diode 32 is high enough to render the diode conductive or not. The critical voltage to make the diode conductive can be adjusted by adjusting the tap on cathode 34 to the desired position on potentiometer 38, the potentiometer having a current flowing through it so that any level of voltage may be picked off from it and applied to the cathode 34 to bias the diode 32 to any desired level. Excessively high voltage suddenly appearing at point A of the input to the network, will cause pickoff diode 32 to become conductive and the pulse will be transmitted via a blocking condenser 40 to an amplifier 42, and thence to shaper 44 and trigger generator 46.

The pulse from the trigger generator is utilized to restore the voltage at point A to a normal value. If the departure from the normal voltage at point A is not too great merely a shunt circuit across the inductor 20 will be established. If the voltage departure is much larger, then the flow of current in the bypass circuit will initiate operation of other means to reestablish normal voltage condition, all as described herebelow.

Shunting the inductor 20 is a gas filled trigger tube 48 in whose cathode circuit is a resistor 50. A pulse emanating from generator 46 will be applied to the grid of the tube via the condenser 52 to permit bypass current to flow through the tube to allow the voltage in the inductor or resonant choke to dissipate through the resistance 50, the shunting resistance lowering the Q of the circuit involving the inductance 20 and thus lowering the voltage imposed on the network 24. The tube is provided with the usual grid resistor 54 to avoid a floating grid. Upon large current flow through the shunt circuit a pulse is transmitted via condenser 56 to a detector 58 wherein the pulse is rectified and transmitted to a filter 60 and then as a steady current to a bridge 62 which may, for example, be a Wheatstone bridge. Controlled by the bridge is a reversible driving motor 64 connected to drive the movable arm 66 of the variable autotransformer. The bridge when not receiving voltage from the filter 60 is upset to cause the drive motor to operate to slowly move the arm 66 in such a direction as to very slowly increase the output voltage from the transformer 10. When voltage is transmitted to the bridge via the condenser 56, the motor is reversed and the movement of the arm 66 is reversed to decrease the voltage output of transformer 10. Thus voltages at A above normal effect regulation of the voltage at that point either by control of the action of inductor 20 along or by control of the inductor and the voltage regulating transformer 10.

In Fig. 2, in line A, there is shown some typical wave forms that may exist at point A in Fig. 1. The solid lines represent the wave forms due to the action of the regulatory means while the dotted lines indicate what the tops of the wave forms might have been without the regulation.

At point B on the potentiometer 30 the wave forms of course would be the same except that the amplitude would be smaller.

At point C the wave form would be much the same in magnitude and form as at point B and is shown in line C of Fig. 2.

At point D the wave is shaped into square wave form as shown in line D of Fig. 2.

The trigger generator 46 differentiates the square wave into sharp pulses as shown in line E of Fig. 2.

Thus, it will be clear that with no current flow across the trigger tube 48, the bridge 62 will be upset to cause the motor 64 slowly to increase the voltage supplied to the pulsing system.

Upon excessive voltage appearing at the output of the inductor 20 the potential at point A will rise. Then, depending on the setting of the movable arm of potentiometer 30 and the bias imposed on the diode 32 due to the position of the cathode tap on potentiometer 38, a pulse from the trigger generator 46 will fire tube 48 to establish a resistive shunt path around inductor 20 lowering the voltage supplied to the LC combination of inductor 20 and capacitative line 24. Also because of current pulse through the resistor 50, the bridge 62 will be upset in opposite sense to what it had been without the application of the pulse and the motor 64 will be driven to set the arm 66 to lower the potential applied to the rectification system and therefore lower the potential to be applied to the magnetron pulsing network.

Having thus described our invention, what we claim as new is:

1. Means for regulating the voltage to be applied to a load comprising means for generating a D. C. potential, means for feeding the D. C. potential to an inductor, said inductor being connected in series in the order named to a diode, an artificial line and the load, the anode of the diode being connected to the inductor, means for pulsing the load comprising a switch for discharging the line and connecting the line and load in series, a pickoff diode, a connection from between the cathode of the diode to the anode of the pickoff diode, means biasing the pickoff diode, a trigger generator controlled by said pickoff diode and a trigger operated switch controlled by said generator, said switch being in a shunt circuit around the inductor.

2. Means for regulating the voltage to be applied to a load comprising means for generating a D. C. potential, means for feeding the D. C. potential to an inductor, said inductor being connected in series in the order named to a diode, an artificial line and the load, the anode of the diode being connected to the inductor, means for pulsing the load comprising a switch for discharging the line and connecting the line and load in series, a pickoff diode, variable means for biasing the pickoff diode, a trigger generator controlled by said pickoff diode and a trigger operated switch controlled by said generator, said switch being in a shunt circuit around the inductor.

3. Means for regulating the voltage to be applied to a load comprising means for generating a D. C. potential, means for feeding the D. C. potential to an inductor, said inductor being connected in series in the order named to a diode, an artificial line and the load, the anode of the diode being connected to the inductor, means for pulsing the load comprising a switch for discharging the line and connecting the line and load in series, a pickoff diode, a connection from between the cathode of the diode to the anode of the pickoff diode, variable means for biasing the pickoff diode, a trigger generator controlled by said pickoff diode and a trigger operated switch controlled by said generator, said switch being in a shunt circuit around the inductor, said connection including a potentiometer having a variably positioned arm and the anode of the pickoff diode being connected to said arm.

4. Means for regulating the voltage to be applied to a load comprising means for generating a D. C. potential, means for feeding the D. C. potential to an inductor, said inductor being connected in series in the order named to a diode, an artificial line and the load, the anode of the diode being connected to the inductor, means for pulsing the load comprising a switch for discharging the line and connecting the line and load in series, a pickoff diode, a connection from between the cathode of the diode to the anode of the pickoff diode, means biasing the pickoff diode, a trigger generator controlled by said pickoff diode and a trigger operated switch controlled by said generator, said switch being in a shunt circuit around the inductor, a resistor in said shunt circuit in series with the switch, a bridge controlled by current flow through said resistor, a reversible motor controlled by said bridge, and means operated by said motor for varying the voltage applied to the D. C. potential generating means.

5. Means for regulating the voltage to be applied to a load comprising means for generating a D. C. potential, means for feeding the D. C. potential to an inductor, said inductor being connected in series in the order named to a diode, an artificial line and the load, the anode of the diode being connected to the inductor, means for pulsing the load comprising a switch for discharging the line and connecting the line and load in series, a pickoff diode, a connection from between the cathode of the diode to the anode of the pickoff diode, variable means for biasing the pickoff diode, a trigger generator controlled by said pickoff diode and a trigger operated switch controlled by said generator, said switch being in a shunt circuit around the inductor, a resistor in said shunt circuit in series with the switch, a bridge controlled by current flow through said resistor, a reversible motor controlled by said bridge and means operated by said motor for varying the voltage applied to the D. C. potential generating means.

6. A circuit for regulating the potential to be applied to a load comprising, an inductor, a first diode, and an artificial line serially connected with said load in the order named with the anode of said first diode connected to one terminal of said inductor, a source of direct current potential coupled to the other terminal of said inductor, means including a switch arranged to discharge said artificial line through said load, a second diode having its anode connected to the cathode of said first diode, means biasing said second diode, a trigger generator controlled by said second diode, and a normally closed switching tube connected in shunt with said inductor and controlled by said trigger generator.

7. A charging circuit for a pulse forming line for regulating the potential to be applied to a load upon discharge therethrough of said line comprising, an inductor and a first diode connected in series with said line and said load in the order named with the anode of said first diode connected to one terminal of said inductor, a source of direct current potential coupled to the other terminal of said inductor, a resistor and a normally non-conducting switch tube having a control grid serially connected in shunt with said inductor, a second diode having its anode connected to the cathode of said first diode and its cathode connected to a source of biasing potential and arranged to derive a voltage proportional to the voltage existing in said line, and a trigger generator connected between the cathode of said second diode and the grid of said switch tube arranged to render said switch tube conducting when the voltage existing in said line exceeds a predetermined value.

References Cited in the file of this patent

UNITED STATES PATENTS

| | | |
|---|---|---|
| 1,583,361 | O'Hara | May 4, 1926 |
| 2,079,500 | Foos | May 4, 1937 |
| 2,510,467 | Fuge | June 6, 1950 |
| 2,593,280 | Elliot | Apr. 15, 1952 |
| 2,629,855 | Schmitt | Feb. 24, 1953 |
| 2,638,571 | Schultz | May 12, 1953 |